United States Patent [19]

Tsutsumi

[11] Patent Number: 5,693,176

[45] Date of Patent: Dec. 2, 1997

[54] TIRE BUILDING MACHINE WITH STITCHING DEVICE

[75] Inventor: Teruhisa Tsutsumi, Kodaira, Japan

[73] Assignee: Bridgestone Corporation, Tokyo, Japan

[21] Appl. No.: 734,775

[22] Filed: Oct. 22, 1996

[30] Foreign Application Priority Data

Oct. 24, 1995 [JP] Japan .................. 7-275380

[51] Int. Cl.$^6$ .................. B29D 30/14; B29D 30/28
[52] U.S. Cl. .................. 156/410; 156/130.3; 156/408; 156/421
[58] Field of Search .................. 156/410, 408, 156/409, 413, 421, 130.3

[56] References Cited

U.S. PATENT DOCUMENTS

| | | | |
|---|---|---|---|
| 983,408 | 2/1911 | Sloper | 156/409 |
| 1,278,980 | 9/1918 | Morton | 156/410 |
| 2,406,093 | 8/1946 | Miller | 156/409 |
| 2,681,684 | 6/1954 | Giletta et al. | 156/410 |
| 3,794,542 | 2/1974 | Colombani et al. | 156/410 |

FOREIGN PATENT DOCUMENTS

| | | | |
|---|---|---|---|
| A-50-83486 | 7/1975 | Japan . | |
| 56-50704 | 12/1981 | Japan | 156/410 |
| A-62-158030 | 7/1987 | Japan . | |
| B2-3-55305 | 8/1991 | Japan . | |

*Primary Examiner*—Geoffrey L. Knable
*Attorney, Agent, or Firm*—Oliff & Berridge

[57] ABSTRACT

A tire building machine includes a tire forming drum which supports a plurality of tire component members, and a stitching device including a pair of stitching rollers for pressure-bonding the tire component members on the tire forming drum to form a green case or a green tire. The stitching device includes a carriage which is reciprocally movable in a direction perpendicular to the center axis of the tire forming drum. The carriage supports a pair of screw rods which are arranged in parallel with the center axis of the tire forming drum. The screw rods are divine into rotation with controlled rotation speeds. A pair of mounts are engaged with the screw rods through respective nuts. A pair of pneumatic cylinders are arranged on the mount, for rotatably supporting the stitching rollers and biasing it toward the tire forming drum. The rotation speeds of the screw rods are independently controlled relative to each other so that the mounts can be tilted about their respective tilting axes.

5 Claims, 6 Drawing Sheets

FIG_1

FIG_4

FIG. 5

FIG_6

FIG_7

TIRE BUILDING MACHINE WITH STITCHING DEVICE

BACKGROUND OF THE INVENTION

1. Field of the Invention

The present invention relates to a tire building machine; in particular, it pertains to a single stage type tire building machine comprising a forming drum on which a plurality of tire component members are pressure-bonded to each other by a stitching device to form a unitary green case or green tire on the forming drum.

2. Description of Related Art

As generally known in the art, a single stage type tire building machine is featured by an arrangement wherein formation of a green case in a first forming phase and formation of a green tire in a second forming phase are carried out on a same forming drum. In order to improve the quality of product tires, it is highly important to ensure that a plurality of tire component members are precisely pressure-bonded to each other. It is a conventional practice that the pressure-bonding is carried out by a stitching device which includes one or more stitching rollers. In order for the stitching roller to perform a precise pressure-bonding of the tire component members, it is necessary to ensure that the pressure of the stitching roller is applied to the surface of the tire forming member at right angles.

Figure 6:
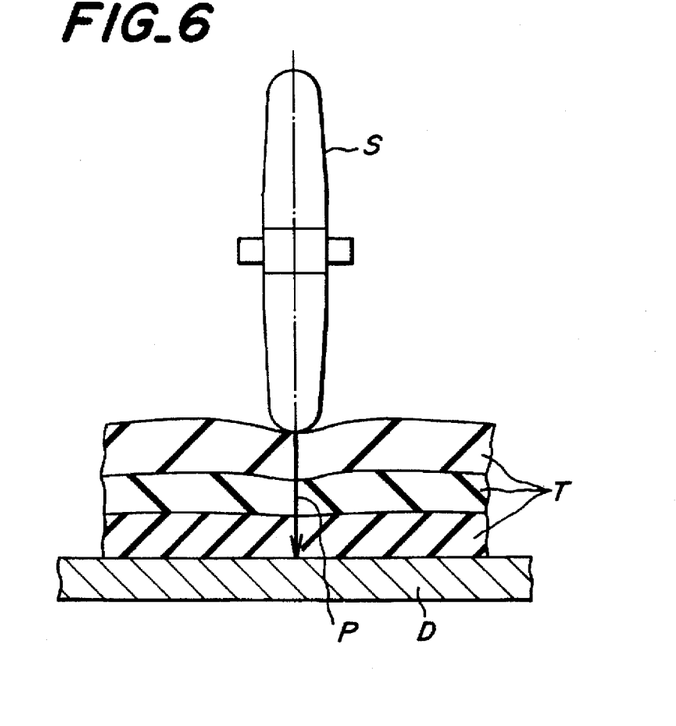
FIG. 6 is an explanatory view discussed above, showing the stitching roller which is urged against the surface of the tire forming member at right angles.
Figure 7:
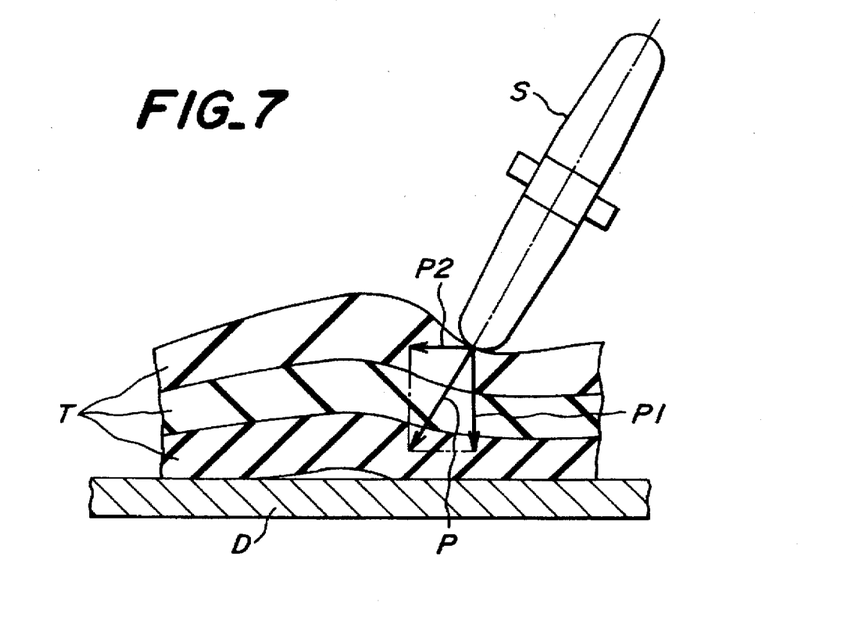
FIG. 7 is an explanatory view also discussed above, showing the stitching roller which is urged against the surface of the tire forming member with a predetermined inclination angle.

A typical stitching roller is shown in FIGS. 6 and 7 in which it is urged against the outer surface of the tire component members T supported on a forming drum D. When the pressure P of the stitching roller S is applied to the surface of the tire component member T at right angles, as shown in FIG. 6, the entirety of the pressure P can be utilized to cause the desired pressure-bonding so that the tire component members are precisely pressure-bonded. When, on the other hand, the pressure P of the stitching roller S is applied to the surface of the tire component member T with a predetermined inclination angle, the pressure is separated into a vertical component force P1 which causes the pressure-bonding, and a horizontal component force P2 which, in turn, generates a lateral force tending to dislocate the tire component members relative to each other. Such a lateral force often results in formation of wrinkles or the like geometrical disorders, separation of the tire component members from each other, and/or inclusion of air between the tire component members.

Particularly in the second forming phase in which a green tire is to be formed, the surface of the tire component members has been changed into a toroidal-shape, so that a specific design of the stitching device is required by which the stitching roller can always be urged against the surface of the tire forming member at right angles despite the surface curvature of the tire component members. This type of stitching device is disclosed, for example, in JP-A-50-83, 486 and JP-B2-3-55.305.

Conventional stitching device is typically comprised of a combination of link mechanism and gear trains, which are not only complex and costly in structure as a whole, but are also still unsatisfactory in that they do not enable a precise pressure-bonding of the tire component members due to a mechanical play, such as a backlash between the gears. More importantly, however, the movable range of the stitching roller is limited by a structural limitation of the link mechanism itself. Therefore, known stitching devices can be applied only to stitching of the tire component members in the shoulder regions of the tire.

DISCLOSURE OF THE INVENTION

It is therefore a primary object of the present invention which eliminates or at least mitigate the above-mentioned drawbacks of the prior art.

Briefly stated, according to the present invention, there is provided a tire building machine which comprises a tire forming drum for supporting a plurality of tire component members, and a stitching device including at least one stitching roller for pressure-bonding the tire component members on the tire forming drum to form a green case or a green tire. The stitching device comprises a carriage which is reciprocally movable in a direction perpendicular to the center axis of the tire forming drum. The carriage serves to support (i) a pair of screw rods which are arranged in parallel with the center axis of the tire forming drum, (ii) driving means for driving the screw rods into rotation and controlling the rotation speed of the screw rods, (iii) at least one mount engaged with the pair of screw rods through respective nuts, and (iv) at least one biasing means fixedly arranged on the mount, for rotatably supporting the stitching roller and biasing it toward the tire forming drum. The driving means is capable of independently controlling the rotation speed of the screw rods relative to each other so that the mount can be tilted about its tilting axis which is perpendicular to a plane defined by the center axis of the tire forming drum and the direction in which the carriage is moved.

Advantageously, the stitching device comprises a pair of stitching rollers in combination with a pair of mounts and a pair of biasing means.

Preferably, the screw rods each comprise a right-hand and a left-hand threaded portions which are arranged in a longitudinal direction of the screw rod. In this instance, the arrangement may be such that one of the mounts is engaged with the right-hand threaded portion and the other of the mounts is engaged with the left-hand threaded portion, so that the mounts can be tilted symmetrically to each other about their respective axes.

The driving means for the screw rods may comprise a pair of motors connected to the respective screw rods, so that either one or both of the screw rods can be rotated by selectively operating the two motors.

Alternatively, the driving means may comprise a single motor and a pair of clutches. In this instance, the motor is connected to the screw rods through the respective clutches so that either one or both of the screw rods can be rotated by selectively engaging or disengaging the two clutches.

DESCRIPTION OF THE PREFERRED EMBODIMENTS

The present invention will now be explained in further detail hereinafter, with reference to specific embodiments shown in the accompanying drawings.

Referring to FIGS. 1 to 4, there is shown a tire building machine according to one preferred embodiment of the present invention. The machine includes a tire forming drum D having a center axis A, for supporting a plurality of tire component members. A carriage 7 is reciprocally movable in a direction which is perpendicular to the center axis A of the drum D. The carriage 7 is driven by a carriage driver 8.

The carriage 7 serves to support a pair of screw rods 4, 5 which are arranged in parallel with the center axis A of the tire forming drum D. These screw rods 4, 5 are connected to, and driven by respective driving means in the form of reversible electric motors 6, 6 which are secured to the carriage 7. A pair of mounts 3, 3 are engaged with the screw rods 4, 5 through respective nuts. A pair of biasing means in the form of pneumatic cylinders 2, 2 are fixedly arranged on the respective mounts 3, 3. These pneumatic cylinders 2, 2 serve to rotatably support respective stitching rollers 1, 1 and biasing the relevant stitching rollers 1, 1 toward the drum D. The motors 6, 6 are capable of independently controlling the rotation speed of the screw rods 4, 5 relative to each other. Thus, the mounts 3, 3 can be tilted about their respective axes which are perpendicular to a plane defined by the center axis A of the tire forming drum D and the direction in which the carriage 7 is moved.

Figure 1:
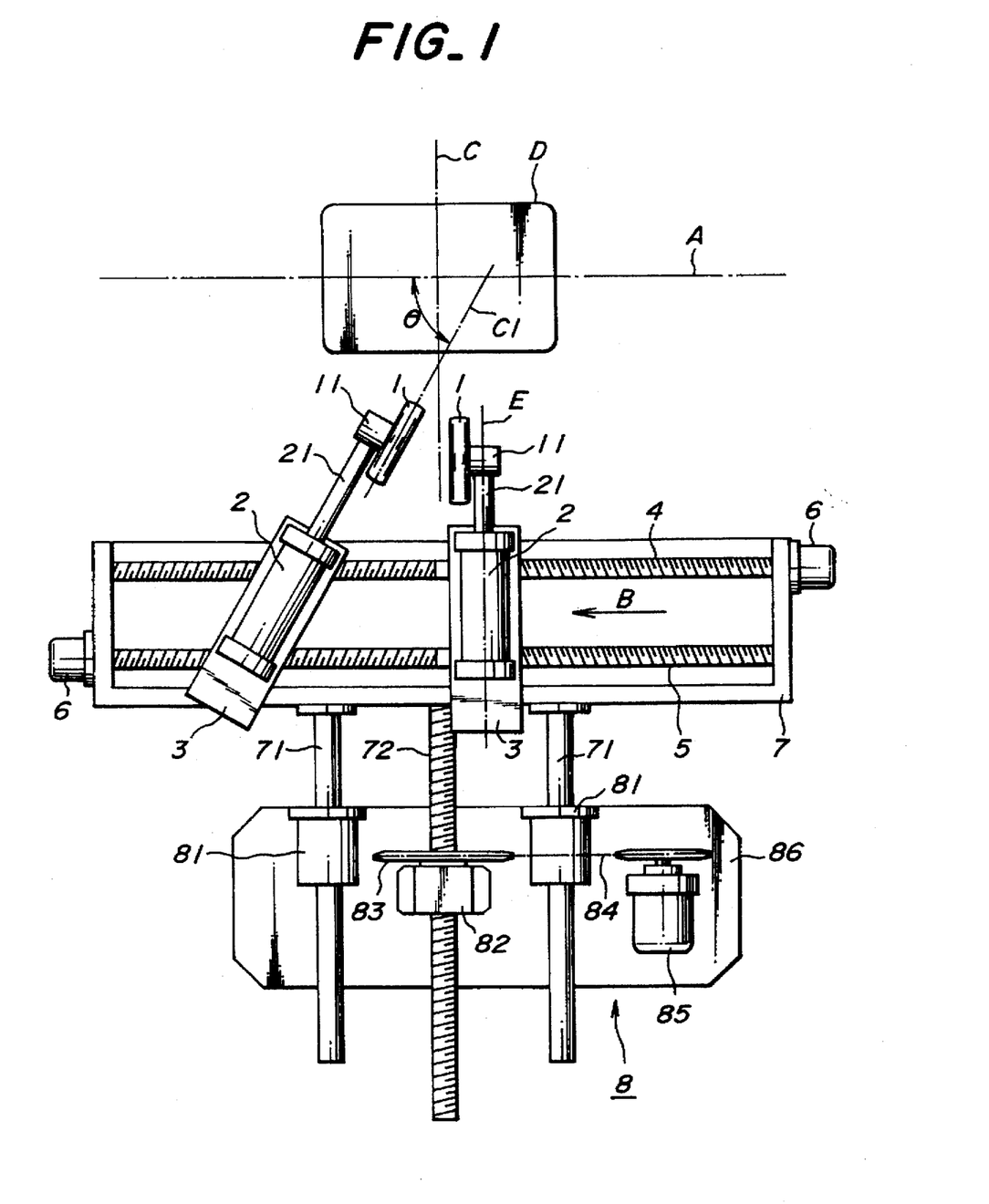
FIG. 1 is a plan view showing a general arrangement of the tire building machine according to one embodiment of the present invention.
Figure 2:
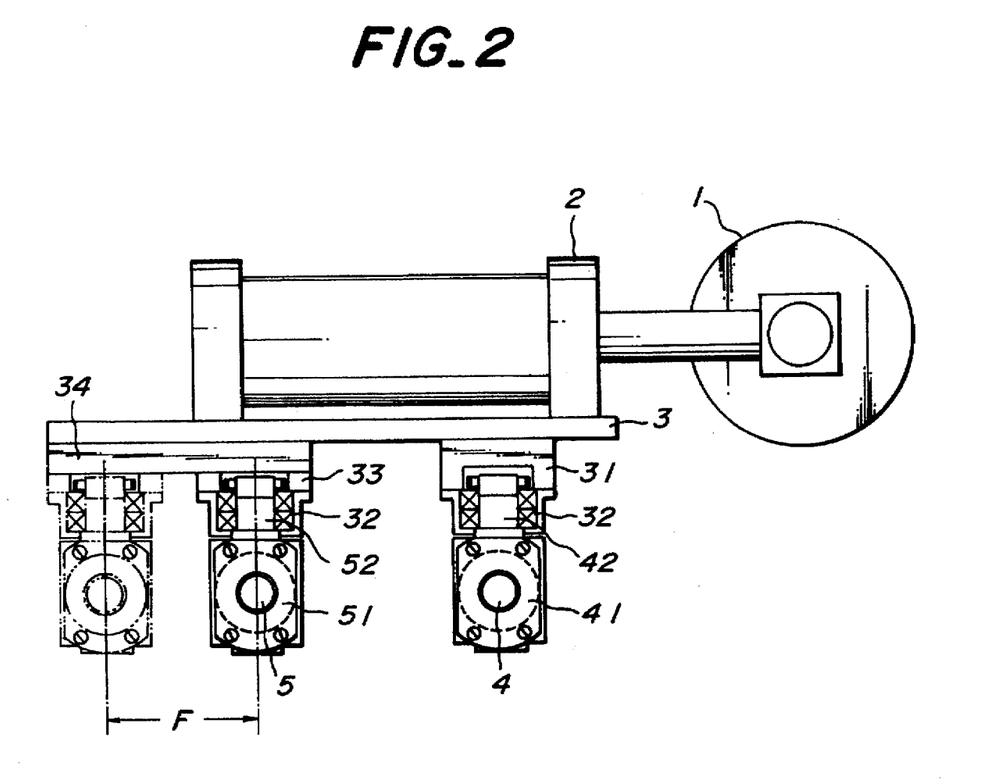
FIG. 2 is a side view, partly in section, of the stitching device shown in FIG. 1, illustrating the relationship between the screw rods and the mounts for the stitching rollers.

Each screw rod 4, 5 comprises a right-hand and a left-hand threaded portions which are arranged in the longitudinal direction of the screw rod. The boundary between the right-hand and left-hand portions corresponds to the longitudinal center C of the drum D. One of the mounts 3, 3 engages with the right-hand threaded portions of the screw rods 4, 5. The other of the mounts 3 engages with the left-hand threaded portions of the screw rods 4, 5.

Thus, when the screw rods 4, 5 are rotated at the same angular speed and in the same direction, the mounts 3, 3 undergo translation movement along the screw rods 4, 5 symmetrically to each other with reference to the longitudinal center C of the drum D, without changing the orientation or tilt angle of the stitching rollers 1, 1. When, on the other hand, only one of the screw rods 4, 5 is rotated without causing rotation of the other, the stitching rollers 1, 1 undergo symmetrical tilting motions. Here, the tilt angle θ of the stitching roller 1, 1 is defined as the angle formed between the center axis A of the forming drum D and the direction C1 in which the stitching roller 1, 1 is urged against the surface of tire component members on the forming drum D, as will be explained hereinafter. Thus, when the tilt angle θ is 90°, the stitching roller 1, 1 is oriented at right angles relative to the center axis A of the forming drum D. The angular range in which the stitching rollers 1, 1 can be tilted may, for example, be from 90° to approximately 35°. By controlling the rotation speed of the screw rods 4, 5 relative to each other, it is possible to cause a complex movement of the stitching rollers 1., 1 in which the translation movement along the screw rods 4, 5 in parallel with the center axis A of the forming drum D is combined with the tilting motion about the respective tilting axes.

Moreover, the stitching rollers 1, 1 and the screw rods 4, 5 are supported by the carriage 7 which is movable in a direction perpendicular to the center axis A of the forming drum D, as mentioned above. Thus, the stitching rollers 1, 1 can be moved in the direction perpendicular to the center axis A of the forming drum D, in addition to the above-mentioned translational movement, tilting movement and complex movement.

A microprocessor or the like controller is advantageously used to control the movement of the stitching rollers 1, 1. In this instance, it is readily possible to ensure that the stitching rollers 1, 1 are moved along the screw rods 4, 5 in parallel with the center axis A of the forming drum D, and/or tilted about the respective tilting axes, whereby optimum tilt angle and trajectory of the stitching rollers can be achieved so that the tire component members T are pressure-bonded to each other under an ideal condition with the stitching rollers 1, 1 urged against the surface of the tire component members T always at right angles, regardless of the position of the stitching rollers 1, 1 along the screw rods 4, 5.

The above-mentioned arrangement of the stitching rollers 1, 1 according to the present invention is particularly advantageous in that, unlike the conventional arrangement using a link mechanism, a linear motion mechanism comprising screw rods is used which provides a movable range of the stitching rollers covering the entire regions of the forming drum simply by the rotation of the screw rods. It is thus possible to carry out stitching and pressure-bonding of the tire component members T to form green tires corresponding to various specifications, ranging from narrow tires for emergency purposes, to wide tires having a low section profile.

The microprocessor or the like controller for controlling the operation of the stitching rollers 1, 1 may comprise a memory which is stored with information relating to the optimum tilt angle and trajectory of the stitching rollers for each tire specification. In this instance, for changing the specification of tire to be formed, all what is required is a simple electrical switching. In other words, the stitching device according to the present invention does not require any mechanical adjustment and/or exchange of mechanical parts of the device.

The stitching device according to the present invention is further advantageous in that the same device can be used for accurately performing stitching of tire component members in both the first and second forming phases to be carried out in a single stage type tire building machine, and that such utility can be obtained basically by a simple arrangement of a pair of screw rods 4, 5.

Further details of the structural features of the stitching device according to the present invention will be explained below.

As shown in FIG. 1, the stitching rollers 1, 1 for pressure-bonding the tire component members T on the forming drum D are each rotatably carried by a bracket 11 through a ball bearing, not shown. The stitching roller 1 is urged against the surface of the tire component members T by a biasing means in the form of a pneumatic cylinder 2. The cylinder 2 includes a plunger rod 21 having a free end to which the bracket 11 is fixedly secured. The cylinder 2 is fixedly secured the mount 3 through bolts or the like fasteners. The magnitude of the pressure P with which the stitching roller 1 is urged against the tire component member T can be properly adjusted by regulating the pressure of air to be supplied to the cylinder 2.

The screw rods 4, 5 are rotatably supported by the carriage 7 through ball bearings, not shown, and are connected to the output shafts of driving motors 6, 6 which, in turn, are fixedly secured to the carriage 7. These motors 6, 6 may comprise servomotors which are capable of independently controlling the rotation speed of the screw rods 4, 5.

With reference to each of the stitching rollers 1, 1, as particularly shown in FIG. 2, a nut 41 is engaged with the screw rod 4 and has a flange which is fixedly secured to a nut housing 42 by fasteners, such as bolts. The nut housing 42 is rotatably supported by a bracket 31 through a ball bearing 32. The bracket 31 is fixedly secured to the mount 3 by bolts or welding. Similarly, a nut 51 is engaged with the screw rod 5 and has a flange which is fixedly secured to a nut housing 52 by fasteners, such as bolts. The nut housing 52 is rotatably supported by a bracket 33 through a ball bearing 32. The bracket 33 is slidably connected to the mount 3 through a sliding connection means 34, such as a groove having a T-shaped cross-section or a linear ball bearing, so that it can be slidingly moved relative to the bracket 3, in a direction indicated by arrow F which is in parallel with the longitudinal axis E (FIG. 1) of the pneumatic cylinder 2 as the biasing means. Thus, the nut 41 in engagement with the screw rod 4 is rotatable relative to the mount 3, while the nut 51 in engagement with the screw rod 5 is not only rotatable, but also slidable relative to the mount 3.

Thus, by controlling the rotation speed of the screw rods 4, 5 relative to each other, it is possible to cause a tilting motion of the mount 3 relative to the center axis A of the drum D with a desired tilt angle, as shown in the left half of FIG. 1. As mentioned above, the tilt angle θ of the stitching roller 1, 1 formed between the center axis A of the forming drum D and the urging direction C1 of the stitching roller 1, 1 may be within a range from 90° to approximately 35°.

The carriage 7 supporting the stitching rollers 1, 1, pneumatic cylinders 2, 2, mounts 3,3, screw rods 4, 5 and motors 6, 6 is connected to the carriage driver 8 which serves to drive the carriage 7 in a direction perpendicular to the canter axis A of the drum D. To this end, as shown in FIG. 1, two guide rods 71, 71 and a screw rod 72 are fixedly secured to the carriage 7 so as to extend in a direction perpendicular to the center axis A of the drum D. The carriage driver 8 includes a base plate 86 which is provided with brackets 81, 81 for the guide rods 71, 71 and a bracket 82 for the screw rod 72. A motor 85 for driving the carriage 7 is fixedly mounted on the base plate 86.

The guide rods 71, 71 extend through the brackets 81, 81 and slidably fitted therein through sliding bushes or ball bushes, not shown, and serve to guide the movement of the carriage 7 toward and away from the drum D. The screw rod 72 is engaged with a ball nut, not shown, which is rotatably supported by the bracket 82. The ball nut is fixedly connected to a sprocket 83 so that rotation of the sprocket 83 causes the ball nut to rotate thereby driving the carriage 7 through the screw rod 72, in a direction perpendicular to the canter axis A of the drum D. The motor 85 comprises a servomotor and has an output shaft which is connected to the sprocket 83 through an endless chain 84. Thus, the sprocket 83 can be driven by the motor 85 at a controlled rotation speed.

The mode for controlling the stitching device according to the embodiment illustrated in FIGS. 1–4 is as follows.

The operations of the above-mentioned three motors, i.e., the motor 6 for driving the screw rod 4, the motor for driving the screw rod 5 and the motor for driving the screw rod 72, are controlled by a controller which comprises a microprocessor.

As mentioned above, when the screw rods 4, 5 are rotated at the same angular speed and in the same direction, the Stitching rollers 1, 1 supported on the mounts 3, 3 undergo transnation movement along the screw rods 4, 5 symmetrically to each other with reference to the longitudinal center C of the drum D, without changing the tilt angle θ. When the screw rod 4 is maintained-stationary and only the screw rod 5 is rotated, the stitching rollers 1, 1 undergo symmetrical tilting motions within angular range from 90° to approximately 35°. By controlling the rotation speed of the screw rods 4, 5 relative to each other, it is possible to cause a complex movement of the stitching rollers 1, 1 in which the translation movement along the screw rods 4, 5 in parallel with the center axis A of the-forming drum D is combined with the tilting motion about the respective tilting axes.

Moreover, the stitching rollers 1, 1 and the screw rids 4, 5 are supported by the carriage 7 which is movable in a direction perpendicular to the center axis A of the forming drum D, as mentioned above. Thus, the stitching rollers 1, 1 can be moved in the direction perpendicular to the center axis A of the forming drum D, in addition to the above-mentioned translation movement, tilting movement and complex movement.

Therefore, by suitably controlling these movements of the stitching rollers 1, 1 by the controller, it is possible to optimize the tilt angle and trajectory of the stitching rollers 1, 1 so that the tire component members T are pressure-bonded to each other under an ideal condition with the stitching rollers 1, 1 urged against the surface of the tire component members T always at right angles, regardless of the position of the stitching rollers 1, 1 along the screw rods 4, 5.

Figure 3:
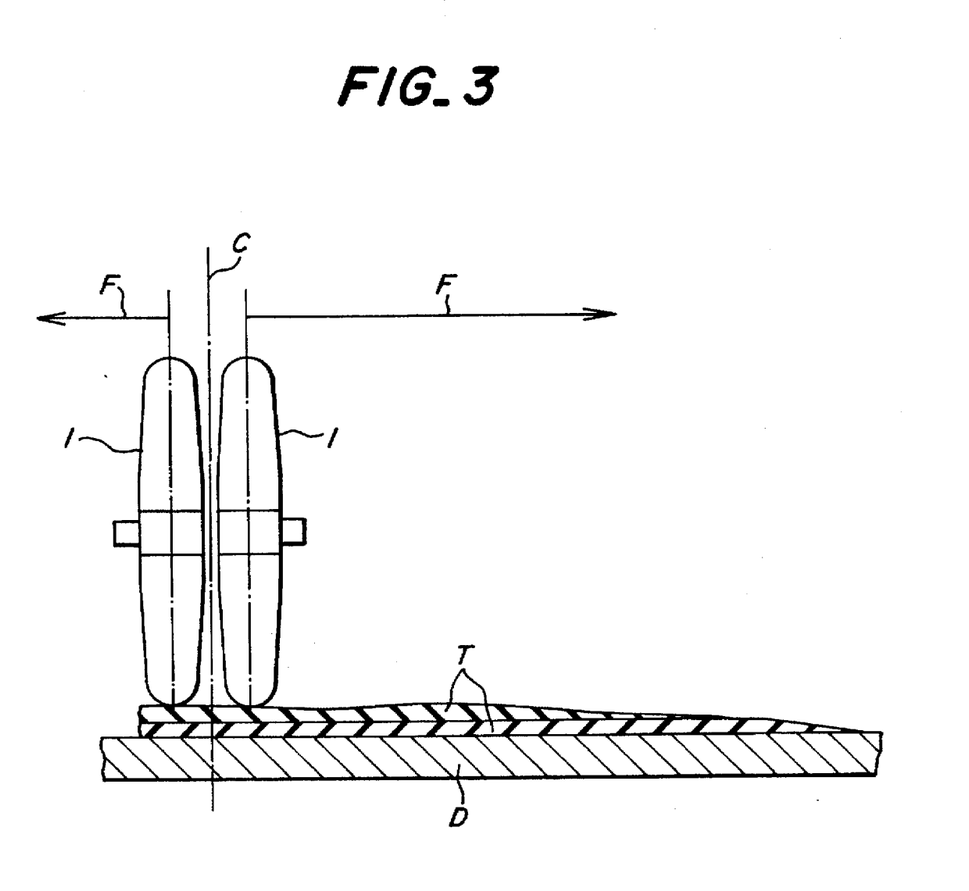
FIG. 3 is an explanatory view showing the operation of the stitching rollers during formation of a band.
Figure 4:
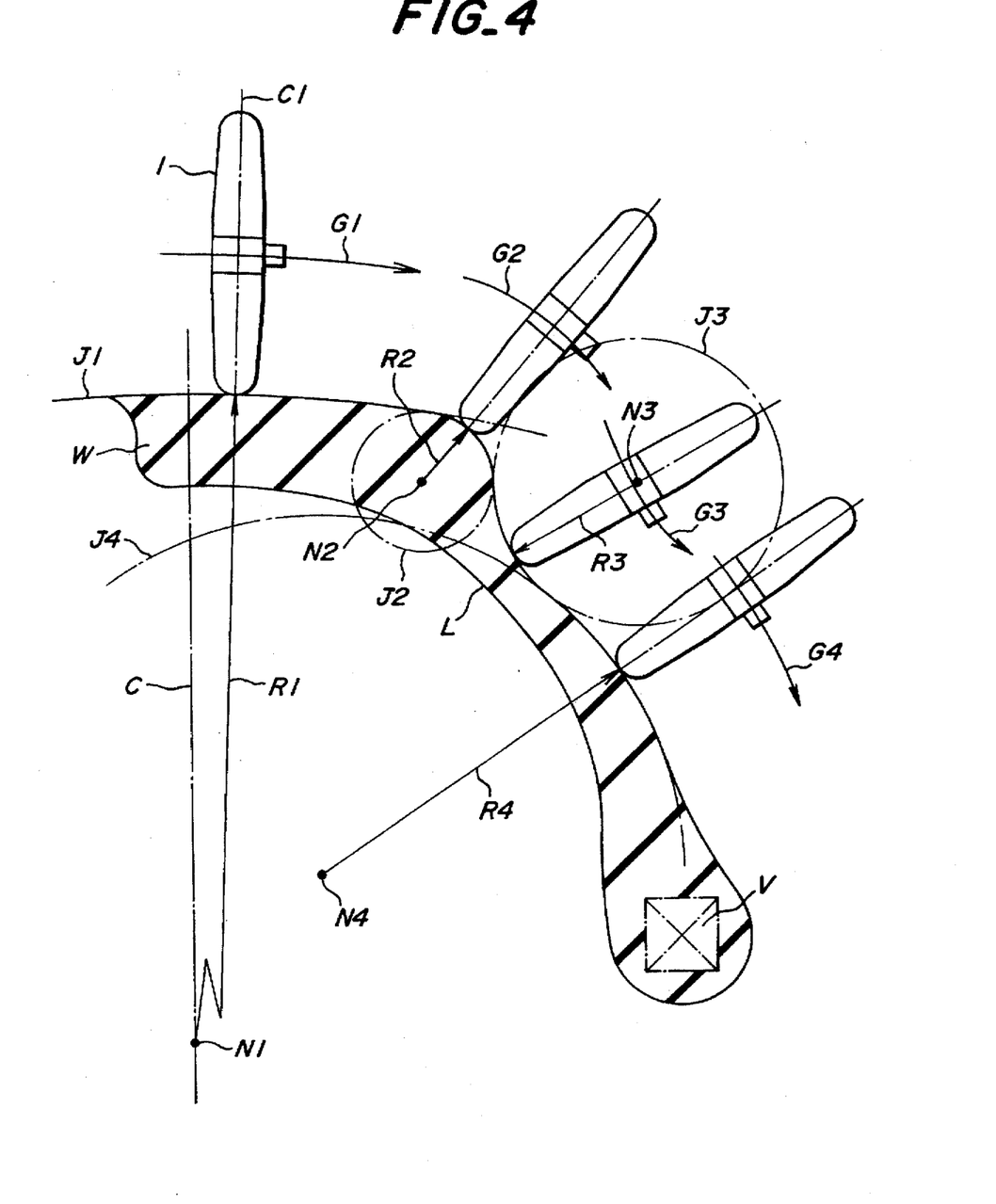
FIG. 4 is an explanatory view showing the operation of the stitching rollers during the second forming phase.

With reference to FIGS. 3 and 4, the mode of pressure-bonding of the tire component members T with the stitching device according to the embodiment illustrated in FIGS. 1–4 will be explained below. It is to be noted that the stitching device may be applied to a single stage type tire building machine in which the first and second forming phases are carried out on the same forming drum D.

FIG. 3 shows the operation of the stitching rollers 1, 1 during formation of a band. In order to form a band, a plurality of types of tire component members T, such as an inner liner, plies, etc., are wound onto the forming drum D. The drum D is generally a cylindrical body having a flat outer surface defined by a generatrix which is in parallel With the center axis A of the drum D. Hence, the outer surface of the tire component members T wound on the forming drum D is substantially parallel to that of the drum D. In order to carry out pressure-bonding of such tire component members T with the stitching device according to the present invention, as particularly shown in FIG. 3, the stitching rollers 1, 1 are maintained oriented at right angles to the outer surface of the drum D, and axially moved in opposite directions as indicated by arrows F symmetrically to each other, from the longitudinal center C of the drum D toward both ends thereof. After these to tire component members have been pressure bonded to each other, formation of a band is completed, Subsequently, beads are set onto the band formed as above. The band is then inflated into a toroidal shape, and plies or the like tire component members are turned around the beads by appropriate turn-up means, such as a bladder. These steps are generally known as the first forming phase, which is to form a green case of the tire. Furthermore, an assembly of a tread member and a belt member which has been formed at a different station $i_s$ pressure-bonded to the green case to form a green tire, and this step is generally known as the second forming phase.

FIG. 4 shows the operation of the stitching rollers 1, 1 in the second forming phase. Because the arrangement of the stitching rollers on the right and left sides of the forming drum D is symmetrical with reference to the longitudinal center C of the drum, the illustration of the left side is omitted for the sake of simplicity. The hatched region in FIG. 4 corresponds to the cross-section of the green case W which has been inflated into toroidal shape. The beads are denoted by reference character V, and the outer surface of the forming drum in the second forming phase is denoted by reference character L.

With reference to the outer surface L of the forming drum, the shape of the outer surface of the green case is highly complex as shown in FIG. 4, since the green case W is comprised of a plurality of tire component members which are superimposed with each other. However, this shape is basically composed of continued arcs. Thus, the shape of the green case W at or near its center region which corresponds to the tread portion of the green tire is expressed as a first arc J1 having a radius R1 and curvature at a point N1. The right side portion of the green case W situated adjacent to the center region has a shape expressed as a second arc J2 having a radius R2 and a center of curvature at a point N2. Similarly, the second arc J2 is connected to a third arc J3 having a radius R3 and a center to of curvature at a point N3, which is situated on the outer side of the green case W. The third arc J3, in turn, is connected to a fourth arc J4 having a radius R4 and a center of curvature at a point N4.

In order properly to carry out the pressure-bonding of the tire component members of the green case W, it is highly important to ensure that the stitching roller 1 is always urged against the outer surface of the green case W regardless of its complex shape. To this end, the movement of the stitching roller 1 is controlled in the following manner.

The stitching along the first arc J1 is performed by moving the stitching roller along the path G1 wherein it is moved axially along the screw rods 4, 5 while controlling the tilt angle such that the extension of its center line C1 always passes the center of curvature N1 until the junction between the first and the second arcs J1 and J2 is reached.

Similarly, the stitching along the second arc J2 is performed by moving the stitching roller along the path G2 wherein it is moved axially along the screw rods 4, 5 while controlling the tilt angle such that the extension of its center line C1 always passes the center of curvature N2 until the junction between the second and the third arcs J2 and J3 is reached.

The stitching along the third arc J3 is performed in essentially the same manner even though the center of curvature N3 is situated on the outer side of the green case W, by moving the stitching roller along the path G3 wherein it is moved axially along the screw rods 4, 5 while controlling the tilt angle such that the extension of its center line C1 always-passes the center of curvature N3 until the junction between the third and the fourth arcs J3 and J4 is reached.

Finally, the stitching along the fourth arc J4 is performed by moving the stitching roller along the path G4 wherein it is moved axially along the screw rods 4, 5 while controlling the tilt angle such that the extension of its center line C1 always passes the center of curvature N4.

By carrying out the pressure-bonding of the tire component members T with each other, while controlling the movement of the stitching rollers 1 in the manner described above, it is possible to ensure that the stitching rollers 1, 1 are always urged against the outer surface of the green case W at right angles so as to produce green tires with an improved quality. The stitching device according to the present invention can be used for stitching operations in the band formation phase and the first and second forming phases.

Another preferred embodiment of the stitching device according to the present invention will be explained below with reference to FIG. 5 wherein elements corresponding to those shown in FIG. 1 are denoted by the same reference numerals and their detailed descriptions are omitted for the sake of simplicity.

Figure 5:
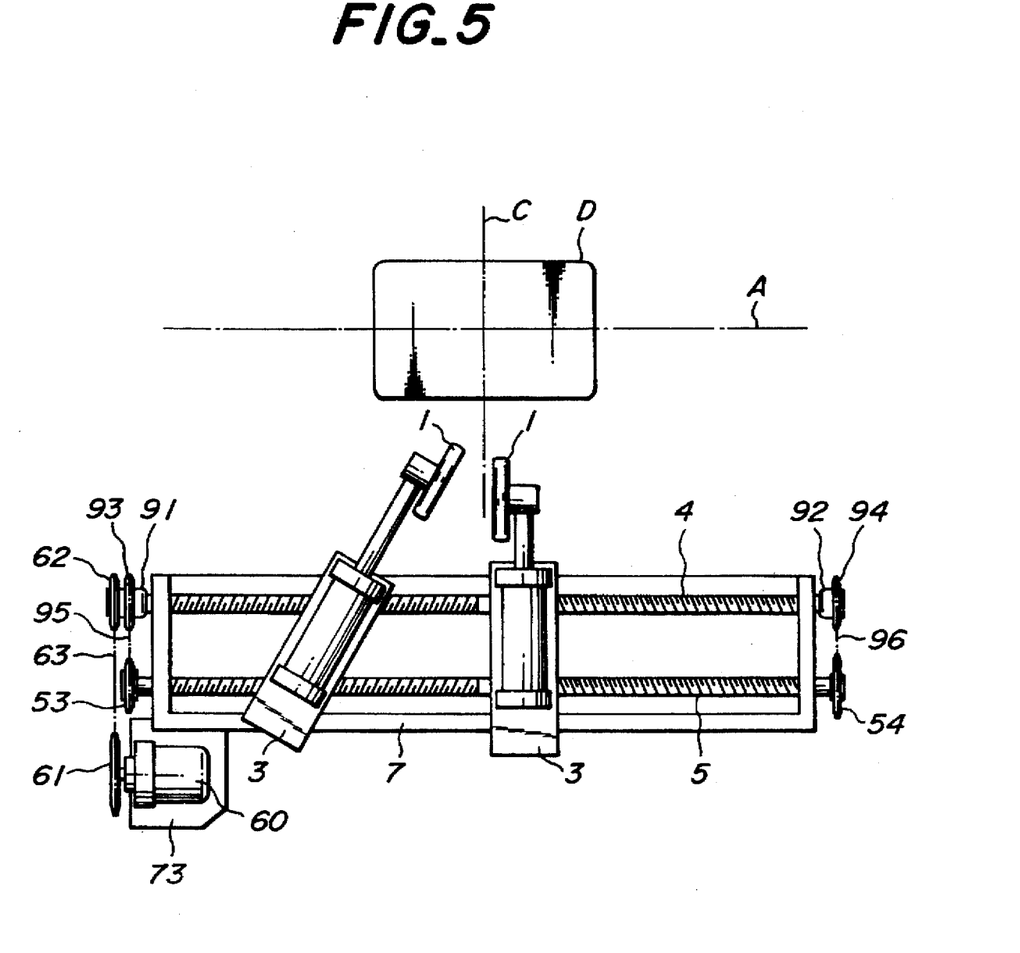
FIG. 5 is a plan view showing a general arrangement of the tire building machine according to another embodiment of the present invention.

The embodiment of FIG. 5 is featured by a different arrangement of the driving means for independently controlling the operation of the screw rods 4, 5. In this instance, the driving means is comprised of a single motor 60 and two clutches 91, 92 connected to both ends of the screw rod 4. By changing the rotation speed of the screw rods 4, 5 relative to each other, it is possible to achieve translation movement of the mounts 3, 3 along the screw rods 4, 5 and/or tilting movement of the mounts 3, 3 about their tilt The motor 60 may be an induction motor which operates at a constant rotation speed. The motor 60 is carried by a supporting plate 73 which is fixedly secured to the carriage 7. The rotation force of the motor 60 is transmitted to the screw rod 4 through a sprocket 61, an endless chain 63 and a sprocket 62.

The clutch 91 is arranged on the left end of the screw rod 4 in FIG. 5, and is connected to the screw rod 5 through a sprocket 93, an endless chain 95 and a sprocket 53. When the clutch 91 is engaged, the rotation force of the screw rod 4 is transmitted to the screw rod 5. Conversely, when the clutch 91 is disengaged, the rotation force of the screw rod 4 is not transmitted to the screw rod 5. In this instance, the number of teeth of the sprocket 93 is the same as that of the sprocket 53, so that the screw rods 4, 5 are rotated at the same rotation speed when the clutch 91 is engaged.

The clutch 92 is arranged on the right side of the screw rod 4 in FIG. 5, and is connected to the screw rod 5 through a sprocket 94, an endless chain 96 and a sprocket 54. When the clutch 92 is engaged, the rotation force of the screw rod 4 is transmitted to the screw rod 5. Conversely, when the clutch 92 is disengaged, the rotation force of the screw rod 4 is not transmitted to the screw rod 5. In this instance, the number of teeth of the sprocket 94 is different from that of the sprocket 54, so that the screw reds 4, 5 can be rotated at different rotation speeds when the clutch 92 is engaged.

The manner of controlling the movement of the stitching rollers 1, 1 in the embodiment of FIG. 5 is as follows.

When the clutch 91 is engaged and the clutch 92 is disengaged, the screw rods 4, 5 are rotated at the same rotation speed. Therefore, the mounts 3, 3 carrying the stitching rollers 1, 1 are caused to undergo translation movement along the screw rods 4, 5 in a symmetrical manner, without changing the tilt angle.

When both of the clutches 91, 92 are disengaged, only the screw rod 4 is rotated and the screw rod 5 is prevented from rotation. Therefore, the mounts 3, 3 carrying the stitching tellers 1, 1 are caused to undergo tilting motion about their tilting axes.

When the clutch 91 is disengaged and the clutch 92 is engaged, the screw rods 4, 5 are rotated at different rotation speeds to that the mounts 3, 3 carrying the stitching rollers 1, 1 are caused to undergo complex movement in which the translation movement and the tilting movement are combined.

The operation of the clutches 91, 92 may be controlled by a controller, such as a sequence controller which includes a memory storing a control program corresponding to various tire sizes.

In this way, with a simple arrangement of a single motor and two clutches, it is possible to control the movement of the stitching rollers such that optimum tilt angle and trajectory of the stitching rollers can be achieved wherein they are urged against the outer surface of the tire component members always at right angles to carry out the pressure-bonding of the tire component members in an ideal manner.

The embodiment of FIG. 5 may be modified such that the clutch 92 is arranged on the right end of the screw rod 5. Alternatively, the rotation force of the motor 60 may be directly transmitted to the screw rod 5, with the clutches 91, 92 being arranged on both ends of the screw rod 5, or the clutch 91 may be arranged on the left end of the screw rod 5 with the clutch 92 being arranged on the right end of the screw rod 4.

It will be appreciated from the foregoing description that, according to the present invention, the stitching device is comprised of a pair of screw rods which are simple and less expensive in structure, and which yet ensures that the stitching rollers are urged against the outer surface of the tire component members always at right angles to realize tires of improved product quality. Moreover, the moving range of the stitching rollers as controlled by the screw rods is wide so that the stitching device can be applied to a single stage type tire building machine in which formation of bands and the first and second forming phases are carried out on a single forming drum. The stitching device according to the present invention can be used for pressure-bonding of tire component members for tires within wide range of specification, including narrow tires and wide tires having a low section profile. Furthermore, the stitching device according to the present invention does not require mechanical changes upon switching of tire sizes, making it readily possible to achieve an improved manufacturing productivity.

While the present invention has been described above with reference to specific embodiments, it is of course that various modifications and/or alterations may be made without departing from the scope of the invention as defined by the appended claims.

What is claimed is:

1. A tire building machine comprising: a tire forming drum for supporting a plurality of tire component members, said tire forming drum having a center axis; and a stitching device including at least one stitching roller for pressure-bonding the tire component members on the tire forming drum to form a green tire:

said stitching device comprising a carriage which is reciprocally movable in a direction perpendicular to said center axis of the tire forming drum; said carriage carrying thereon
   (i) a pair of screw rods which are arranged in parallel with said center axis of the tire forming drum,
   (ii) driving means for driving said screw rods into rotation and controlling the rotation speed of the screw rods,
   (iii) at least one mount engaged with said pair of screw rods through respective nuts, and
   (iv) at least one biasing means fixedly arranged on said at least one mount, for rotatably supporting said at least one stitching roller and biasing it toward the tire forming drum, wherein said driving means is capable of independently controlling the rotation speed of the screw rods relative to each other so that said mount can be tilted about its tilting axis which is perpendicular to a plane defined by said center axis of the tire forming drum and said direction in which said carriage is moved.

2. The tire building machine according to claim 1, wherein said stitching device comprises a pair of said stitching rollers in combination with a pair of said mounts and a pair of said biasing means.

3. The tire building machine according to claim 2, wherein said screw rods each comprises a right-hand and a left-hand threaded portions which are arranged in a longitudinal direction of the screw rod, one of the mounts engaging with the right-hand threaded portion and the other of the mounts engaging with the left-hand threaded portion so that the mounts can be tilted symmetrically to each other about the respective axes.

4. The tire building machine according to claim 1, wherein said driving means comprises a pair of motors connected to the respective screw rods.

5. The tire building machine according to claim 1, wherein said driving means comprises a single motor and a pair of clutches for selectively rotating the screw rods.

* * * * *